United States Patent [19]

Ozrovitz

[11] Patent Number: 5,213,507
[45] Date of Patent: May 25, 1993

[54] INSTRUCTIONAL CHILD'S STORY AND PICTURE BOOK

[76] Inventor: Aaron B. Ozrovitz, 22820 Twyckingham Way, Southfield, Mich. 48034

[21] Appl. No.: 959,485

[22] Filed: Oct. 9, 1992

Related U.S. Application Data

[63] Continuation of Ser. No. 624,615, Dec. 10, 1990, abandoned.

[51] Int. Cl.$^5$ .................. G09B 17/00; A63F 9/10
[52] U.S. Cl. .................. 434/178; 273/157 R; 434/406
[58] Field of Search .............. 273/157 R; 434/317, 434/406, 178

[56] References Cited

U.S. PATENT DOCUMENTS

| | | |
|---|---|---|
| 117,443 | 7/1971 | Mills . |
| 1,189,598 | 7/1916 | McLean ............ 273/157 R |
| 1,217,632 | 2/1917 | Pritchard ............ 273/157 R |
| 1,383,097 | 6/1921 | Gibson ............ 273/157 R X |
| 1,405,193 | 1/1922 | Favreau . |
| 1,480,458 | 1/1924 | Mershon . |
| 1,570,906 | 1/1926 | McCord ............ 273/157 R X |
| 1,701,557 | 2/1929 | Clinch et al. ............ 273/157 R |
| 2,010,830 | 8/1935 | Staudte ............ 462/84 |
| 2,036,341 | 4/1936 | Lemburg . |
| 2,538,085 | 1/1951 | Cotton . |
| 2,670,961 | 3/1954 | Winters . |
| 2,946,137 | 7/1960 | Worth et al. . |
| 3,094,791 | 6/1963 | Thiebes . |
| 3,257,128 | 6/1966 | Schneider . |
| 3,274,706 | 9/1966 | Friend . |
| 3,280,499 | 10/1966 | Studen ............ 273/156 |
| 3,414,296 | 12/1968 | Schneider . |
| 3,433,485 | 3/1969 | Renn et al. ............ 273/157 R |
| 3,471,962 | 10/1969 | Klein . |
| 3,578,331 | 5/1971 | De Gast ............ 273/157 R |
| 3,740,081 | 6/1973 | Whipperman . |
| 3,815,920 | 6/1974 | Carter et al. ............ 273/157330312 |
| 3,918,174 | 11/1975 | Miller et al. . |
| 3,924,879 | 12/1975 | Wright . |
| 4,051,607 | 10/1977 | Sullivan ............ 273/157 R X |
| 4,092,449 | 5/1978 | Bernstein . |
| 4,176,473 | 12/1979 | Rae . |
| 4,773,786 | 9/1988 | Pozzobon . |
| 4,799,680 | 1/1989 | Weimar ............ 273/157 R |
| 4,943,088 | 7/1990 | Wada . |
| 5,049,078 | 9/1991 | Thomsen ............ 434/178 |
| 5,104,125 | 4/1992 | Wilson ............ 273/157 R |

FOREIGN PATENT DOCUMENTS

| | | |
|---|---|---|
| 2412468 | 9/1975 | Fed. Rep. of Germany ... 273/157 R |
| 3303882 | 8/1984 | Fed. Rep. of Germany ... 272/157 R |
| 1149981 | 7/1957 | France ............ 273/157 R |
| 342912 | 2/1931 | United Kingdom ............ 273/157 R |
| 447152 | 5/1936 | United Kingdom ............ 273/157 R |
| 812336 | 4/1959 | United Kingdom ............ 273/157 R |
| 2196542 | 5/1988 | United Kingdom ............ 273/157 R |

OTHER PUBLICATIONS

Fisk, "Magic Puzzle", Washington Post Magazine, Apr. 20, 1980, p. 55.
Word Making Productions, "Snoopy Snake and Other Stories", 1979, p. 11.
Early Childhood Catalog, "Sketch-a-Puzzle", May 1976, p. 41.

Primary Examiner—Richard J. Apley
Assistant Examiner—Karen A. Jalbert
Attorney, Agent, or Firm—Krass & Young

[57] ABSTRACT

The present invention is an instructional child's story and picture book including a front cover, a back cover, and a plurality of pages pivotally disposed between the front and back covers. At least one of the pages includes text on one or more sides and a puzzle on the other side. The puzzle includes a plurality of interlocking puzzle pieces to provide a hand and eye coordination and recognition manipulative for children.

4 Claims, 1 Drawing Sheet

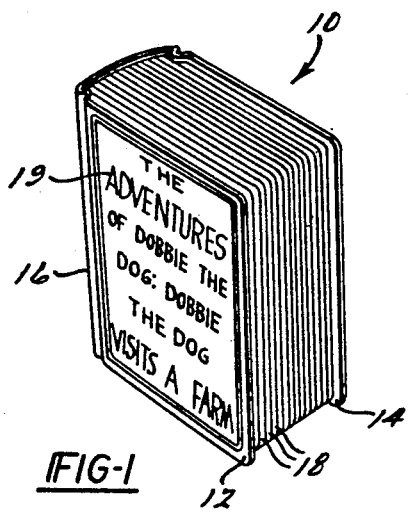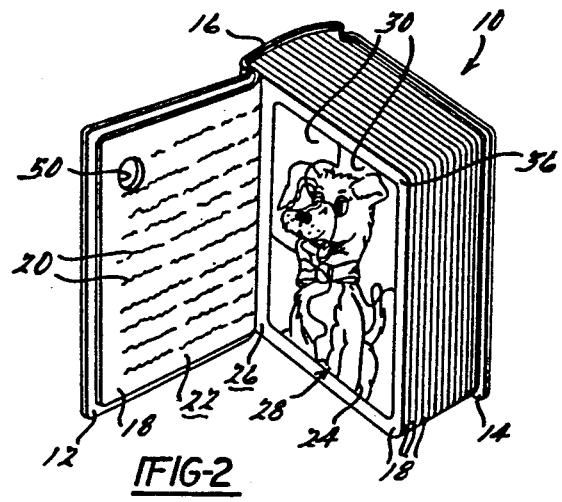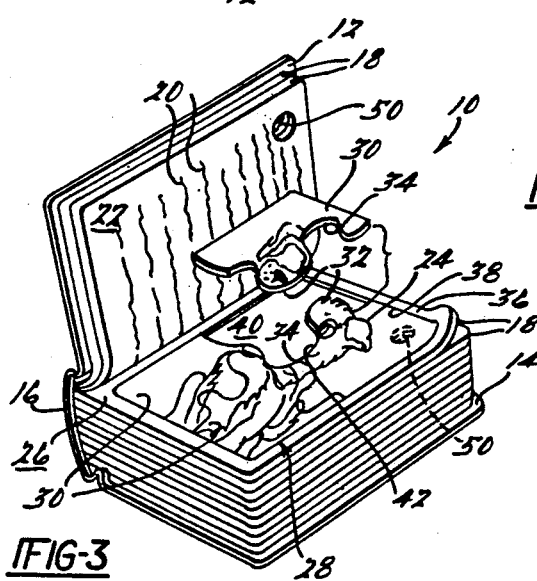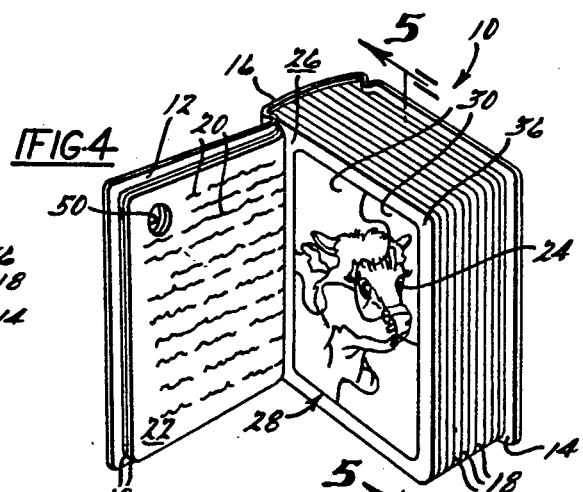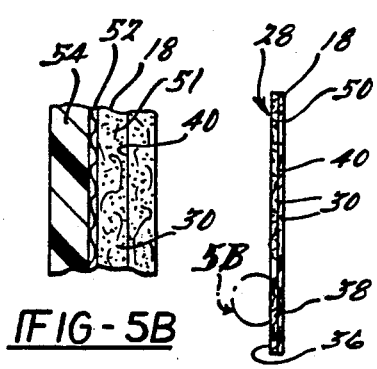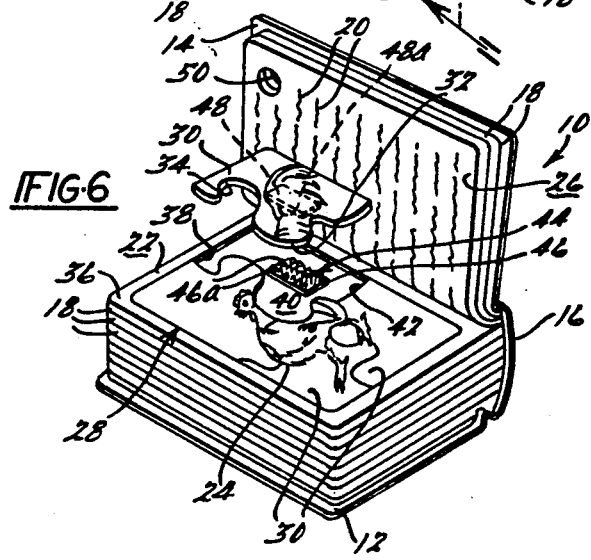

INSTRUCTIONAL CHILD'S STORY AND PICTURE BOOK

This is a continuation of co-pending application Ser. No. 624,615 filed on Dec. 10, 1990, abandoned.

BACKGROUND OF THE INVENTION

1. Field of the Invention

The present invention relates generally to books, and more particularly to, an instructional child's story and picture book for improving and strengthening hand and eye coordination and recognition skills.

2. Description of the Related Art

It is well recognized that reading and learning processes are enhanced when the reader's interest is maximized. For example, when learning is made entertaining in some manner, a child is more likely to want to learn. An accepted method for teaching children to read is to recognize words with pictures illustrating the words.

To increase the child's ability to learn, a need exists to include in the text hand and eye coordination and recognition manipulatives. The hand and eye coordination and recognition manipulatives help to improve thinking and solving skills, small motor coordination skills (e.g. ability to work puzzles) and recognition skills of the child.

SUMMARY OF THE INVENTION

It is, therefore, one object of the present invention to provide an instructional child's story and picture book with hand and eye coordination manipulatives and recognition manipulatives.

It is another object of the present invention to provide a book which functions as an educational and/or instructional device for children.

It is yet another object of the present invention to provide a book having the text of a story and/or instructions on at least one side of one page and a puzzle on at least one side of one page corresponding to the text.

It is still another object of the present invention to improve the thinking and solving skills, small motor coordination skills, and recognition skills of children.

To achieve the foregoing objects, the present invention is an instructional child's story and picture book including a front cover, a back cover, and a plurality of pages pivotally disposed between the front and back covers. At least one of the plurality of pages includes text on at least one side and a puzzle on the other side. The puzzle includes a plurality of interlocking puzzle pieces to provide a hand and eye coordination and recognition manipulative for children.

One advantage of the present invention is that the book provides hand and eye coordination and recognition manipulatives along with an interesting text. As a result, the book helps a child learn to read while giving information such as numerous facts that they can learn (e.g., what a cow looks like, that a cow lives on a farm, gives milk and makes a mooing sound). Another advantage of the present invention is that the book functions as an educational and/or instructional device that enhances the co-ordinating abilities of children. A further advantage of the present invention is that the book provides two separate hand and eye coordination and recognition manipulatives on at least one page. As a result, the two separate hand and eye coordination and recognition manipulatives help improve thinking and solving skills, small motor coordination skills, and recognition skills along with success in completing tasks. Yet a further advantage of the present invention is that the book lessens the frustration level connected with reading because of the puzzle and coloring which is a physical activity. Still a further advantage of the present invention is that reading practice, reading comprehension, picture recognition, and vocabulary are increased which allows the child success in connection with reading. This increases positive feelings about reading which makes it an enjoyable experience.

Other objects, features and advantages of the present invention will be readily appreciated as the same becomes better understood by those skilled in the art after reading the following description when considered in connection with the accompanying drawings.

BRIEF DESCRIPTION OF THE DRAWINGS

FIG. 1 is a perspective view of an instructional child's story and picture book according to the present invention.

FIG. 2 is a view similar to FIG. 1 with the book opened.

FIG. 3 is an exploded perspective view of the opened book of FIG. 2.

FIG. 4 is a view similar to FIG. 2 with the book opened to another page.

FIG. 5A is a sectional view taken along line 5—5 of FIG. 4.

FIG. 5B is an enlarged view of a portion of structure in circle 5B of FIG. 5A.

FIG. 6 is an exploded perspective view of an alternate embodiment of the book of FIG. 1.

DESCRIPTION OF THE PREFERRED EMBODIMENT(S)

Referring to FIG. 1, an instructional child's story and picture book 10 according to the present invention is shown. The book 10 is an educational and/or instructional device for children which provides hand and eye coordination and recognition manipulatives along with educational, informational, reading material. The book 10 may be constructed for children of all age groups, and all levels of education ranging from pre-school and beyond. The book 10 allows a child to improve their word attack skills, thinking and solving skills, small motor coordination skills, and recognition skills. It should be appreciated that the book 10 becomes more advanced for each educational level.

The book 10 includes a generally rectangular front cover 12, back cover 14 and binding or backbone 16 therebetween. The book 10 also includes a plurality of pages or leaves 18 pivotally disposed between the front and back covers 12 and 14. Preferably, the pages 18 are pivotally secured to the backbone 16 between the front and back covers 12 and 14 in any suitable and conventional manner, for example, such as by an adhesive. It should be appreciated that the pages 18 may be pivotally disposed between the front and back covers 12 and 14 by any suitable means, for example, such as a ring holder found in a ring binder. It should also be appreciated that the book 10 may be made in any suitable size or shape.

The front and rear covers 12 and 14 are made of a substantially rigid material, for example, such as cardboard. The front cover 12 includes a title 19 printed thereon. The title 19 is for a story contained in the book 10 such as "THE ADVENTURES OF DOBBIE THE DOG: DOOBIE THE DOG VISITS A FARM". In one form of the present invention, it is contemplated that such a story could be broken down into a series of single episodes, each one of which may be printed on at least one page.

Referring to FIGS. 2 through 4, the book 10 is opened to one of the pages 18. The page 18 includes text 20 in the form of the story which is disposed on at least one side such as a back or rear side 2 of the page 18. The text 20 will have lettering of a size suitable for a particular learning level. The page 18 also has an image 24, such as prints, pictures, colors, or words, disposed on a front or forward side 26 of the page 18. As illustrated in FIG. 2, the image 24 is in the form of a picture of a dog. As illustrated in FIG. 4, the image 24 is in the form of a picture of a cow.

Preferably, the image 24 is in the form of a puzzle, generally indicated at 28, to provide a hand and eye coordination manipulative for the reader. As illustrated in FIG. 2, the book 10 is opened such that text 20 is on a left-hand side page and the puzzle 28 is on a right-hand side page. The text 20 on the left-hand side page, which is disposed on the rear side 22 of a previous page 18, corresponds to the puzzle 28 on the right-hand side page, which is disposed on the front side 26 of the opened page 18. Alternatively, as illustrated in FIG. 6, the puzzle 28 may be on the left-hand side page and the text 20 on the right-hand side page. It should be appreciated that text 20 may also be located on the puzzle page alone, on both the left-hand side page and right-hand side page simultaneously or a puzzle on both the left-hand side page and right-hand side page with text 20 on either or both.

The puzzle 28 includes a plurality of interlocking puzzle pieces 30. Preferably, each puzzle piece 30 is interlocking with an adjacent puzzle piece 30 such that when the puzzle pieces 30 are interlocked together, they form a puzzle 28. In the preferred embodiment, the puzzle 28 is generally rectangular includes four (4) puzzle pieces 30. It should be appreciated that the puzzle 28 may include at least two (2) puzzle pieces 30 depending on the educational level of the child. It should also be appreciated that the puzzle 28 may be of any suitable shape, for example, such as circular.

Each puzzle piece 30 may have a male portion 32 and/or a female portion 34 for cooperating with corresponding portions on an adjacent puzzle piece 30. The male and female portions 32 and 34 matingly engage each other to interlock one puzzle piece 30 with an adjacent puzzle piece 30. Preferably, the puzzle pieces 30 interlock together to form a single puzzle 28. The puzzle pieces 30 are made of a light weight material such as foam coreboard, mat board, cardboard, wood, plastic or any suitable type of material used in manufacturing puzzles. It should be appreciated that a puzzle piece 30 may have all male or female portions 32 and 34 or a combination of both. It should also be appreciated that the puzzle pieces 30 may be similar in shape for different puzzles 28 on different pages 18.

Each page 18 includes a top or outer surface 36. In the preferred embodiment, the page 18 has a cavity 38 extending inwardly into the page 18 from the top surface 36. Preferably, the cavity 38 is generally rectangular in shape and has a bottom surface 40. Optionally, the bottom surface 40 may have prints, pictures, colors, numbers, words or an embedded groove 42 outlining each puzzle piece 30 so that the child will be able to look and see where each puzzle piece goes. It should be appreciated that the prints, pictures, colors, numbers, words or groove 42 may not be needed for books that are written for more advanced levels of reading.

In the preferred embodiment, the puzzle pieces 30 are disposed in the cavity 38 and held in place by friction or interference fit between the and other puzzle pieces puzzle 28 and walls of the cavity 38. Optionally, a securement structure, generally indicated at 44 in FIG. 6, may be used to hold the puzzle pieces 30 to the page 18 so the pieces 30 will not fall off as the pages 18 are turned. The securement structure 44 may include a strip 46 disposed within the cavity 38 and secured to the bottom surface 40. The strip 46 may include a plurality of hook-like members 46a. The securement structure 44 may also include a strip 48 secured to the back surface of the puzzle piece 30. The strip 48 may include a felt-like material 48a. It should be appreciated that velcro fasteners or any other type of suitable securing structures may be used to removeably secure the puzzle 28 within the cavity 38. It should also be appreciated that the bottom surface 40 could include strip 48 and the puzzle pieces 30 include the strip 46.

Alternatively, the page 18 may eliminate the cavity 38 and the outer surface 36 may include either strip 46 or 48 and the puzzle pieces 30 include the other of strips 46 and 48.

Additionally, each page 18 also includes an aperture 50 extending therethrough to the cavity 38 to allow a child to remove a first puzzle piece 30. The aperture 50 is of a suitable diameter such as one (1) inch to allow a child's finger to pass through. In the preferred embodiment, the aperture 50 is located near the top left hand corner of the page 18. For example, a child may pass their finger or another object through the aperture 50 to push out the puzzle piece 30 to remove it from the cavity 38. Once the first puzzle piece 30 is removed, the child may remove the remaining puzzle pieces 30 with their fingers and hands.

Referring to FIGS. 5A and 5B, preferably, each puzzle piece 30 is made of a base material 51 and an overlay material 52 on which the images 24 are printed, such as prints, pictures, words, numbers or colors. The overlay material 52 is secured to the base material 51 by suitable means, for example, such as an adhesive. Optionally, the images 24 have colored portions. Optionally, the puzzle pieces 30 may have a transparent material 54 such as plastic disposed over and attached to the overlay material 52. The transparent material 54 allows the images 24 printed on the overlay material 52 to be visible through the transparent material 54. The transparent material 54 allows an erasable material to be used by the child to color on the puzzle pieces 30 to provide another hand and eye coordination or recognition manipulative. Preferably, the transparent material 54 covers only the puzzle pieces 30. The erasable material may be a marker, a pencil, or crayon, which will wipe off the transparent material 54 with a paper towel or the like. Preferably, the erasable material comprises paraffin wax and colored pigment powder held together by a binder such as steric acid. Such an erasable material may be purchased commercially under the trade name CRAYOLA.

In operation, the puzzle pieces 30 may be disposed in the cavity 38 and interlocked together to form the puzzle 28. The child may open the book 10 to a particular page 18. The child may read the text 20 on the opposed or left-hand side page or on the right-hand side picture page 18. The child may also perform at least one hand and eye coordination and recognition manipulative by coloring with an implement having an erasable material on portions of the puzzle pieces 30. It should be appreciated that the child can match the color of the implement to the color of the associated image 24. It should also be appreciated that no parts, some parts or all parts of the image 24 may be colored by the child depending on the learning level of the child.

Additionally or alternatively, the child may place their finger through the aperture 50 and remove the first puzzle piece 30 of the puzzle 28. This gives the child coordination, cause and effect. The child may then grasp and remove the remaining puzzle pieces 30. The child may perform the second hand and eye coordination and recognition manipulative by placing the puzzle pieces 30 back into the cavity 38 by disposing the male portions 32 into the female portions 34 to interlock the puzzle pieces 30 together to form the puzzle 28.

Accordingly, the book 10 according to the present invention helps a child learn to read while at the same time imparting to them something that they can learn (e.g., what a cow looks like, that a cow lives on a farm, gives milk and makes a mooing sound). With the book 10, the child can just read; do one or both of the hand and eye coordination and recognition manipulatives on each page 18; or do all three to reinforce all learning skills and give them success in completing tasks. The book 10 can be adapted to any suitable shape, form, size or reading level.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A multi-stimulus method for the concomitant development of cognitive and motor skills comprising:
   I. providing a multi-functional book comprising:
      A. a plurality of pages, each page having:
         (i) a first face including a cavity defined therein, and a plurality of puzzle pieces, each puzzle piece including a portion of a first display therein, said pieces configured to be retained in said cavity in a preselected pattern and to cooperate to define said first display when so retained; and
         (ii) a second face having a second display thereupon, one of said first display and said second display comprising a body of text and the other of said first display and said second display comprising a picture, said picture being provided with a layer of transparent material thereupon, said text on one of said plurality of pages corresponding to said picture on another one of said plurality of pages;
      B. a binding operative to retain said pages in a preselected order so that, when said book is opened, a picture disposed on a first one of said pages is adjacent to a corresponding body of text disposed on a second one of said pages, said text corresponding to said picture;
   II. providing an erasable implement operative to make removable marks on the layer of transparent material disposed on said picture;
   III. opening said book so as to display a picture and corresponding text;
   IV. executing a cognitive task comprising, viewing the second display on a preselected one of said pages, and;
   V. executing at least one motor task selected from group consisting of: removing the puzzle pieces from a page adjacent said preselected page, replacing the puzzle pieces into the cavity in said page so as to form said first display, coloring said picture, and erasing a colored portion of said picture; whereby the execution of said cognitive and motor tasks provide for the mutual reinforcement thereof.

2. A method as in claim 1, wherein the step of providing a multi-functional book comprises providing a book wherein at least one of said pages has an aperture therethrough and wherein the step of removing said puzzle pieces comprises inserting a finger through the aperture so as to push a puzzle piece from the cavity in the page.

3. A method as in claim 1, wherein the step of providing an erasable implement comprises providing a crayon.

4. A method as in claim 1, wherein the step of executing a cognitive task further includes viewing said picture.

* * * * *